United States Patent

[11] 3,632,927

[72] Inventor Joseph J. Gribble
Milwaukee, Wis.
[21] Appl. No. 77,518
[22] Filed Oct. 2, 1970
[45] Patented Jan. 4, 1972
[73] Assignee Square D Company
Park Ridge, Ill.

[54] ELECTRIC SWITCH AND SWITCH ENCLOSURE FOR MOTOR BRANCH CIRCUITS
5 Claims, 3 Drawing Figs.
[52] U.S. Cl..................................................... 200/144 R,
200/168 B
[51] Int. Cl..................................................... H01h 9/30,
H01h 33/02
[50] Field of Search......................................... 200/144 R,
168 B, 168 H; 335/69, 201; 337/151, 146, 186

[56] References Cited
UNITED STATES PATENTS
3,538,287  11/1970  Mrenna......................... 200/144 R X
2,863,969  12/1958  Edmunds....................... 200/144 R
1,752,514  4/1930   Van Valkenburg............. 337/146

*Primary Examiner*—Bernard A. Gilheany
*Assistant Examiner*—Dewitt M. Morgan
*Attorneys*—Harold J. Rathbun and William H. Schmeling ABSTRACT: A motor controller that is intended to be used in a branch circuit to an electric motor and includes an enclosed manually operated overload responsive switch. The enclosure for the switch is provided with a removable cover and a means which are positioned by the cover relative to the overload responsive units of the switch to reduce the length of the arcs generated within the enclosure and the temperature of the hot gases exiting from the enclosure when the current through the branch circuit has a magnitude sufficient to destroy current responsive units.

PATENTED JAN 4 1972

3,632,927

INVENTOR.
JOSEPH J. GRIBBLE
BY
William H. Schmeling

ELECTRIC SWITCH AND SWITCH ENCLOSURE FOR MOTOR BRANCH CIRCUITS

This invention relates to a protective enclosure for a current responsive electric switch and is more particularly concerned with an arrangement for controlling the electric arcs generated within the enclosure and reducing the temperature of the gas exiting from the enclosure when the current responsive units of the switch are subjected to destructive electric currents.

The present National Electric Code defines a branch circuit as that portion of a wiring system extending beyond the final overcurrent device protecting the circuit and permits a plurality of motors to be connected in a single branch circuit providing each motor is protected by a motor controller that is approved for the type of service involved and includes a device that protects the motor against running overcurrents. According to the Code, a motor controller is a device which governs the electric power delivered to a motor to which it is connected. One form of motor controller that is frequently used in group installation includes a device known as a manual motor starter and a sheet metal enclosure for the starter. Manual starters are devices having a manually operated switching section, that includes contacts which complete and interrupt the circuit to the motor, and an overload responsive section that includes units which detect the current to the motor and respond to an excess motor current to cause the contacts of the switching section to open and interrupt the circuit to the motor. When motor controllers, including manual starters, are tested for approval for use in group installations by organizations such as the Underwriters Laboratories, the motor controllers are subjected to currents in excess of the current carrying capabilities of the manual starters. During the tests for group installation, the thermal units used in the starter are permitted to burn out and the contacts of the switching portion of the starter are permitted to become welded together and in fact, the entire starter may be damaged without constituting a failure. However, during the tests, a shroud of cotton is placed around the exterior of the enclosure for the stater and the ignition of the cotton by arcing within the enclosure or the hot gases exiting from the enclosure when the thermal units burn out is considered a failure. The motor controller according to the present invention is intended for use in group installations and includes a switching assembly commonly known as a manually operated motor starter that has its melting alloy-type overload units exposed on the front surface of the overload portion of the starter in a position so that arcs are generated between the overload units and the interior of the enclosure when the controller is tested for group installations.

In the controller according to the present invention, the addition of a flame barrier at the junction of the box and cover in the vicinity of the overload units and a grounding plate which has a sharp edge positioned as close to the overload units as the prescribed electrical clearances will permit, functions to cool the hot gases exiting from the enclosure and reduces the length of the arc to prevent ignition of the cotton shroud during the test.

It has been discovered that without the grounding plate, as included in the enclosure according to the present invention, the length of the arcs is random with the short arcs causing no failure and the long arcs causing ignition of the cotton shroud during tests.

It is an object of the present invention to provide a motor controller enclosure with a means for reducing the temperature of gases exiting from the enclosure and controlling the length of arcs generated within an enclosure when the motor controller is subjected to current flows which are in excess of the current carrying capabilities of the switching device within the enclosure.

An additional object is to provide the cover for a motor controller enclosure with a baffle plate and a ground plate which respectively will cool the gases exiting from the enclosure and control the length of arcs generated within the enclosure when the controller is subjected to currents which will cause damage to components of switching device within the enclosure.

Further objects and features of the invention will be readily apparent to those skilled in the art from the specification and appended drawing illustrating certain preferred embodiments in which.

Figure 3:
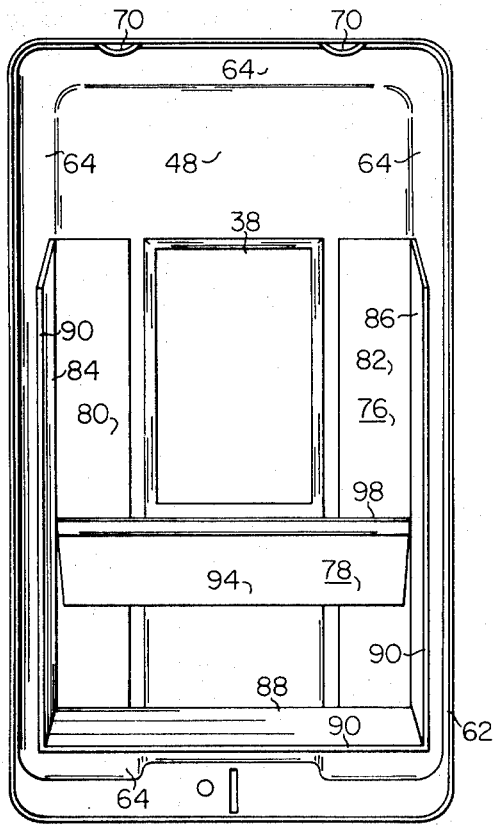
FIG. 3 is a plan view showing the inside of the cover for the enclosure in FIG. 1.

In the drawing, a motor controller 10 includes a manually operated electric switch assembly 12 which is enclosed by an enclosure 14 in a manner as will be hereinafter described so that the controller 10 may be used to control and protect a motor against excess current flow in a general purpose branch circuit defined as a group installation by the National Electric Code. The enclosure 14 includes a switch box 16 and a cover 18 which is removably secured to the box 16 to provide access to the switch assembly 12 when the cover 18 is detached from the box 16. The box 16 has a rear wall, 20 which conventionally is attached to a vertical support, not shown, and four sidewalls 22 each of which extends from the rear wall 20 to a free edge 24 to provide the box with an open front and expose the interior 26 of the box 16 when the cover 18 is removed. The sidewalls 22 and the rear wall 20 are arranged so that the interior 26 is generally rectangular in shape with rounded corners.

The switching assembly 12, which per se does not constitute a feature of the present invention, as switching assemblies other than that shown may be readily used therewith, is more fully disclosed in an application for U.S. Pat. Ser. No. 9,203, filed by the inventor Jordan F. Puetz on Feb. 6, 1970. The switching assembly 12 has four sidewalls 28 rectangularly disposed and spaced from the internal surfaces of the sidewalls 22 when a rear wall 30 of the switching assembly 12 is mounted on the rear wall 20.

As disclosed in the Puetz application, the switching assembly includes an operating section 32 and a current responsive section 34 having components which operate and cooperate so the switching device will provide the function of a device known as a manually operated electric motor starter in an electric circuit. The operating section 32 extends forwardly from the rear wall 30 to a portion 36 having a generally rectangular shape that extends through an opening 38 in the cover 18. The portion 36 and the opening 38 are shaped and sized relative to each other so the clearance between the portion 36 and the material of the cover 18 surrounding the opening 38 is minimal. Extending from the portion 36 is an operating lever 40 that is pivotably movable between an ON and OFF as well as a RESET position. While in the embodiment shown, the lever 40 is pivotably movable, it is clearly apparent the lever 40 may be replaced by a pair of linearly movable ON- and OFF-RESET buttons, if desired. The lever 40, when manually operated, actuates a movable contact structure within the operating section 32 to open and close an electric circuit and complete a circuit between terminals, not shown, at an upper end 42 of the switching assembly 12 and terminals including screws 44 which are exposed on a front wall 46 of the current responsive section 34.

Figure 1:
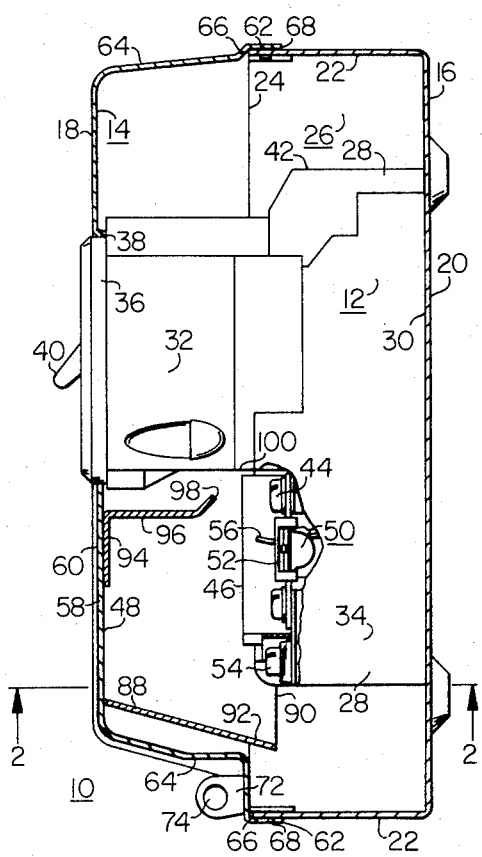
FIG. 1 is a side view of a motor controller incorporating the features of the present invention wherein a manually operated current responsive switch, shown in full lines, has a portion thereof broken away to illustrate one of the current responsive units of the switch, is mounted in an enclosure shown in cross section.
Figure 2:
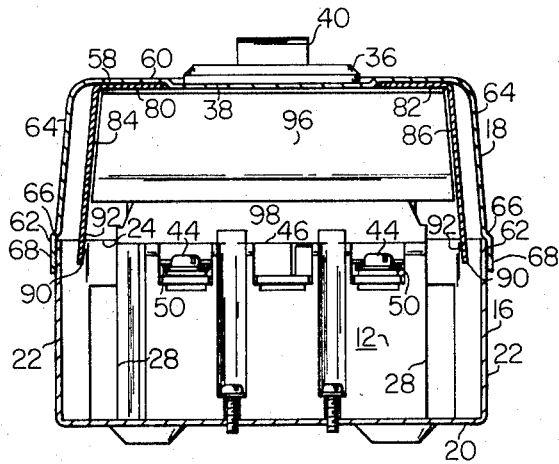
FIG. 2 is a cross-sectional view taken along line 2—2 in FIG. 1.

The front wall 46, which is spaced from an inner surface 48 of the cover 18, includes three parallel compartments each of which is arranged to have a current responsive unit 50 mounted therein so that the switching assembly may be connected in a three phase circuit. While other forms of current responsive units may be used in accordance with the present invention, in the embodiment shown, each current responsive unit 50 includes a solder-type current responsive portion which has a heater element 52 connected between the screw 44 and a screw 54. The screws 44 and 54 serve to mount the units 50 on the front wall 46. In FIG. 2, the screws 54 are omitted so that the screws 44 may be seen. A typical example of a current responsive unit 50 is disclosed in the Van Valkenburg U.S. Pat. No. 1,752,514, issued Apr. 1, 1930. When a current flowing through a circuit monitored by the unit 50 and the heater element 52 exceeds a predetermined value, the solder within the unit 50 melts and permits a ratchet wheel, not shown, of the current responsive unit 50 to rotate. The ratchet wheel normally is held against rotation and maintains a lever 56 against movement so that the components of the operating section 32 are maintained in a RESET condition. The ratchet wheel, when free to rotate, permits the lever 56 to move forwardly, as in FIG. 1, so that the components including the movable contacts within the operating section move to a tripped position and open the electric circuit through the switching assembly.

The cover 18 has a front wall 58 with the opening 38 extending between the internal surface 48 and an external surface 60 of the front wall 58. Extending between the front wall 58 and a continuous flange 62 are sidewalls 64. The flange 62 has a ledgelike portion 66 which is adjacent the free edge 24 to provide the enclosure with an enclosed interior when the cover 18 is positioned on the box. The flange 62 also has a skirt portion 68 which overlaps the sidewalls 22 with minimal clearance to obstruct the flow of gas from the interior to the exterior of the enclosure 14 and maintain the cover 18 in its assembled position on the box 16. The cover is maintained in its assembled position by a suitable means, such as a pair of projections 70, on the upper end of the cover 18 which are received in suitable openings in the box 16 and a projection 72 on the box 16 which extends through a slot in the cover 18 and includes an opening 74 which may receive the hasp of a padlock for the purpose of preventing removal of the cover 18 from the box 16.

Secured on the internal surface 60 of the cover 18 is a means which cooperates with the skirt portion 68 to reduce the lengths of the arcs generated within the enclosure 14 and the temperature of the arcs exiting from the enclosure when the current responsive units 50 are subjected to a current which is sufficient to destroy the current responsive units 50. The means includes a baffle 76 and an arc grounding plate 78. The baffle 76, as shown, is formed as a single metal part to have a pair of mounting portions 80 and 82 secured to the inner surface 48 on opposite sides of the opening 38, a pair of inclined wall portions 84 and 86 extending from the mounting portions 80 and 82, and an inclined wall portion 88 interconnecting the ends of the walls 84 and 86. The walls 84, 86 and 88 are arranged so the free ends 90 thereon extend into the space between the internal surface of the sidewalls 22 and the sidewalls 28 to provide a surface 92 that is aligned and spaced from the junction between the ledgelike portions 66 and the free edges 24. The walls 84, 86 and 88 are inclined so that expanding gases generated in the vicinity of the current responsive units 50 will be deflected into the space between the walls 22 and 28 and in a direction away from the opening between the cover 18 and the box 16 that extends along the free edges 24. In the embodiment shown, the walls 84, 86 and 88 are arranged to extend along the three sidewalls 22 defining the portion of the enclosure 14 occupied by the current responsive section 34. The grounding plate 78 is formed as an L-shaped metal part having a portion 94 secured on the inner surface 48 and a portion 96 generally perpendicular to the surface 48 to a curved end which provides a free edge 98. The portion 96 extends generally parallel and spaced from a wall portion 100 on the operating section 32 a distance to position the free edge 98 a minimal electrical clearance distance from the screws 44 which, according to present Underwriters standards, is not less than one-half inch.

During normal operation of the motor controller 10, the switching assembly 12 will open the circuit to the motor without damage in response to normal motor overload currents. However, in certain low-cost installations, classified as group installations, the motor controller is not expected to interrupt the circuit under abnormal current conditions and may be severely damaged before the fuses and the like protecting the circuit respond and interrupt the circuit. Devices, when tested for approval for group installation by organizations such as the Underwriters Laboratories, are subjected to currents in excess of their current carrying capabilities. Thus during the tests for group installation, the thermal units 50 are permitted to burn out and the contacts within the operating section are permitted to become welded together and, in fact, the entire switching assembly 12 may be damaged without constituting a failure. However, during the tests, a shroud of cotton is placed around the exterior of the enclosure 14 and the ignition of the cotton by arcing within the enclosure 14 or the hot gases exiting from the enclosure 14 when the thermal units 50 burn out is considered a failure. During the test, the proximity of the sharp edge 98 to the screws 44 of the current responsive units 50 causes the arcs to ground when the thermal units 50 burn out to be consistently short and thereby the heat generated by the arcs will be minimized before they are extinguished because of the opening of the branch circuit fuses. The absence of the plate will cause the arcs to have a random length with the short arcs causing no failure and the long arcs causing ignition of the cotton and hence a failure of the controller to pass the test. During the test the grounding plate 78, because of its proximity to the wall 100, cools the hot gas generated by the arcs before the gas exits through the opening 38 as the hot gases pass between the portion 96 and the wall 100. The function of the baffle 76 is to both deflect the gases away from the junction of the cover 18 and the box 16 and to cool the gases before the gases exit through the junction to prevent ignition of the cotton in the area where the skirt 68 overlaps the side walls 22 of the box 16.

While certain preferred embodiments of the invention have been specifically disclosed, it is understood that the invention is not limited thereto, as many variations will be readily apparent to those skilled in the art and the invention is to be given its broadest possible interpretation within the terms of the following claims.

What is claimed is:

1. A motor controller comprising: an enclosure including a box and a cover, said box having a rear wall and sidewalls extending from the rear wall to free edges which provide the box with an open front and an exposed interior when the cover is separated from the box, said cover having a front wall, sidewalls and a continuous flange, said front wall having an internal side, an external side and an opening therein, said sidewalls of the cover extending from the front wall to the continuous flange to provide the enclosure with a closed interior when the cover is positioned on the box, and said continuous flange having a skirt portion overlapping portions of the sidewalls of the box when the cover is mounted on the box, a manually operated electric switch assembly having a rear wall secured to the rear wall of the box and sidewalls spaced from the internal surfaces of the sidewalls of the box, said assembly including an operating section having a portion closing the opening in the cover and providing an operating lever at the external side of the cover, and a current responsive section including a plurality of current responsive units mounted on a front wall of the current responsive section in spaced relation to the internal side of the cover, and means carried by the cover for reducing the length of arcs generated within the enclosure and the temperature of hot gases exiting from the enclosure when the current responsive units are subjected to electric currents of a magnitude sufficient to destroy the current responsive units, said means including the skirt portion, a baffle having a portion secured to the internal side of the cover and a portion extending into the space between the sidewalls of the assembly forming the current responsive section and the sidewalls of the box and a grounding plate having a portion secured to the internal side of the cover and a portion extending to provide a free edge that is spaced a predetermined distance from the current responsive units.

2. The motor controller as recited in claim 1 wherein the grounding plate includes a portion that is positioned by the cover to cool the hot gases exiting through the opening in the cover.

3. The motor controller as recited in claim 1 wherein each current responsive unit is of the melting alloy-type and includes a mounting screw that provides the portion that is spaced the predetermined distance from the free edge of the grounding plate.

4. The motor controller as recited in claim 3 wherein the mounting screw is located on the current responsive section so as to be adjacent a wall portion of the operating section and the grounding portion has a portion extending parallel and spaced from the wall portion.

5. The motor controller as recited in claim 1 wherein the baffle has portions extending adjacent three sidewalls of the box.

* * * * *